United States Patent Office 3,407,157
Patented Oct. 22, 1968

3,407,157
TABLET COATING COMPOSITIONS COMPRISING METHYL VINYL ETHERMALEIC ANHYDRIDE COPOLYMER, PLASTICIZER AND SURFACE ACTIVE AGENT
Jens Thuroe Carstensen, Montvale, and John James Vance, Park Ridge, N.J., assignors to Hoffmann-La Roche Inc., Nutley, N.J., a corporation of New Jersey
No Drawing. Filed May 19, 1965, Ser. No. 457,161
12 Claims. (Cl. 260—23)

ABSTRACT OF THE DISCLOSURE

A coating composition is described which contains, as essential ingredients, (a) a water-soluble interpolymer of methylvinyl ether and maleic anhydride, (b) glyceryl monostearate, polyoxyethylene sorbitan monooleate, dioctyl sodium sulfosuccinate or a mixture thereof and (c) acetone, ethyl acetate or a mixture thereof as an inert organic solvent for the interpolymer. The compositions are used to film-coat pharmaceutical tablets.

---

This invention relates, in general, to new and improved edible coating compositions. More particularly, the invention relates to novel, pharmaceutically acceptable coating compositions and to the use thereof in the pharmaceutical field.

The desirability of applying protective and decorative coatings to pharmaceutical compositions has long been recognized. An effective coating provides a barrier which serves to protect the active components of a pharmaceutical tablet from the destructive influences of the atmosphere. Additionally, an effective coating can serve to mask the unpleasant or bitter taste which may characterize any component of the tablet. Furthermore, by means of a pigmented coating, color can be imparted to tablets to enhance their attractiveness.

In recent years, a considerable amount of work has been carried out in an effort to provide suitable protective coatings for pharmaceutical tablets. As a result, many and various coating compositions, and a number of procedures for applying same to medicament-containing tablets, are presently known in the pharmaceutical art. Obviously, many of the prior art coating compositions and procedures have proven to be functionally adequate. Despite this, however, a majority of these are not devoid of disadvantageous features. For example, a number of compositions, and/or procedures by which such compositions are applied, do not afford the ingredients of the tablets, particularly the active drug components thereof, with adequate protection against the destructive influences of the atmosphere. On the other hand, many of the prior art compositions, and procedures, which have been found to be satisfactory for use, accomplish the desired result only when they are applied to the tablet in very many layers. In addition to being expensive, this unduly increases the size and weight of the tablet and, often times, it effects, materially, the disintegration time of the tablet.

In its broadest embodiment, the present invention provides improved tablet coating compositions.

In a more limited embodiment, the invention provides compositions which are especially well suited for use in the coating of pharmaceutical tablets, and which, when so used, protect the ingredients, particularly the active drug components, of the tablets without unduly increasing the weight or size of the tablet or prolonging its disintegration time.

Furthermore, the invention provides film-coating compositions which are capable of being applied quickly and easily to pharmaceutical tablets.

The film-coating compositions of this invention comprise, as the essential ingredients thereof, (1) a water-soluble, high molecular-weight polymer of the type described hereinafter, (2) a surface active agent and (3) an organic solvent for the polymer. Additionally, the coating compositions of this invention can contain, as optional ingredients, many of the adjuvants which are normally found in the coating compositions described in the prior art. These optional ingredients, include, for example, plasticizers, pigments, lake dyes, FD&C dyes, D&C dyes, dusting agents, etc.

The high molecular weight polymer which is employed in formulating the composition of this invention is a linear polymeric anhydride which, chemically, is the interpolymer of methylvinyl ether and maleic anhydride having an average molecular weight of about 250,000. A polymer of this tpye, which has a structure corresponding to a one to one molar ratio of vinyl ether to anhydride, is available commercially under the trade name Gantrez AN-119. The solubility of Gantrez AN-119 in water is limited only by the viscosity of its solutions. The polyanhydride slowly hydrolyzes in the presence of water to form the free acid which is readily soluble in water. Thus, while for the purpose of further identification the polymer used herein has been, and will be, referred to as a water-soluble polymer, it is to be understood that the term embraces a polyanhydride of the type described which hydrolyzes in water to form the readily water-soluble free acid. The quantity of polymer which is present in the compositions of the invention is variable within relatively wide ranges. Thus, for example, the coating compositions of the invention can contain from about 3.0% to about 20.0% by weight of the polymer. However, the compositions which are produced in the preferred embodiment of the invention contain from about 3.0% to about 10.0% by weight of the polymer.

As the surface active agent there can be used, for example, glyceryl monostearate, polyoxyethylene sorbitan monooleate or dioctyl sodium sulfosuccinate. Moreover, mixtures of these surface active agents can be used, if desired. A polyoxyethylene sorbitan monooleate which is suitable for use in the practice of this invention is commercially available under the trade name Tween 80. The dioctyl sodium sulfosuccinate, which can be employed in formulating the present compositions, is available commercially under the trade name Aerosol OT. While the surface active agent is an essential component of the film-coating compositions of this invention, the quantity of that ingredient used in producing the compositions is relatively small. For example, the final compositions must contain at least about 0.001% of the surface active agent and, at the same time, they should contain not more than about 0.05% by weight thereof. The products which are produced in the preferred embodiment of the invention contain from about 0.01% to about 0.05% by weight of surface active agent.

In the practice of this invention, there can be used any inert, organic solvent in which the polymer component of the product is soluble. The term "inert" is used herein to designate the use of a solvent which is not reactive with the other components of film-coating compositions of this invention or with the ingredients of the tablets coated therewith. Such solvents include, for example, ethyl acetate, acetone, etc., as well as mixtures thereof.

As indicated heretofore, the compositions of this invention can contain many of the conventional adjuvants normally found in the film-coating compositions of the prior art. Thus, for example, a plasticizing agent, such as, castor oil, diethyl phthalate, dioctyl phthalate, etc. or mixtures thereof, can be employed in the practice of this invention. While the quantity of plasticizer used is variable, generally the amount thereof which is present in the final product will not exceed about 5.0% by weight. Furthermore, the compositions can contain dusting agents and/or deglomeration agents, such as, titanium dioxide, colloidal silica, etc., or mixtures thereof. A colloidal silica product which is especially well suited for use is the product sold under the trade name "Cab-o-sil." The quantity of titanium dioxide and/or colloidal silica present in the final products is variable. In general, however, the quantity of titanium dioxide which is used will not exceed about 10.0% of the weight of the final product and the amount of colloidal silica which is employed will not exceed about 1.0% of the weight of the final product. However, it has been found that particularly advantageous results are obtained when titanium dioxide comprises up to about 2.0% of the weight of the final coat, and when there is present in the product also colloidal silica in a quantity equivalent to about 1.0% of the weight of the titanium dioxide present therein. Additionally, pigments and dyes can be incorporated into the present products, if desired. Any pigment or dye can be used. The quantity of pigment or dye used is variable and, in general, there can be incorporated into the composition up to the limit of the dye solubility.

The compositions which are produced in the preferred practice of the invention contain the following named ingredients in the quantities, all of which are given by weight, hereinafter indicated:

| | Percent |
|---|---|
| Gantrez AN-119 | 3.5 to 5.5 |
| Ethyl acetate | 85.0 to 95.0 |
| Diethyl phthalate | 0.5 to 2.0 |
| Aerosol OT | 0.001 to 0.05 |
| Titanium dioxide | 1.0 to 10.0 |
| Colloidal silica | 0.01 to 0.1 |
| Pigment/lake dye | 1.0 to 3.0 |

In such a formulation, acetone can be used as the solvent in place of ethyl acetate; and castor oil or dioctyl phthalate can be used as the plasticizer in place of diethyl phthalate. Moreover, glyceryl monostearate or polyoxyethylene sorbitan monooleate can be used as the surface active agent in lieu of Aerosol OT. As the pigment and/or lake dye there can be used D&C Yellow #11 and/or FD&C Yellow #5 Lake.

The compositions of this invention are readily prepared. The preparative method involves dissolving the polymer component in the solvent. This is accomplished readily by stirring the polymer in the solvent at room temperature or at a temperature which is elevated somewhat above room temperature. Thereafter, the surface active agent is added to, and dissolved in, the polymer solution. Subsequently, the optional components, i.e. the plasticizer, dusting agent, deglomerating agent, pigment, dye, etc. are added to the product. The product is then homogenized by any one of appropriate means.

As indicated heretofore, the compositions of this invention are used to film coat pharmaceutical tablets. The manner in which the compositions are employed to coat such tablets will be readily apparent to those skilled in the art. In general, the tablets which are to be coated are placed in a standard coating pan and a sufficient quantity of the composition of this invention is poured into the pan to completely wet the tablets. The pan is rotated until all of the coating composition has been adsorbed by the tablets. The tablets are then dried with cool air, following which a second coat is applied, in this instance using only that quantity of coating material required to cover the product. A third coat is applied in the same manner as the second coat and subsequent coats are applied in a similar manner. The number of coats applied in any given instance will vary, depending generally upon the specific formulation in use. Ordinarily, completely satisfactory results will be obtained when a maximum of about five coats are applied, with the tablets being dried between each coat. If desired, however, a larger number of separate coats can be applied, for example, up to about twelve. Under ordinary circumstances, the application of more than twelve coats will serve no useful purpose. After the coating operation is complete, the tablets are transferred to a polishing pan where they are dusted with a suitable polishing agent. Powdered carnauba wax is an example of a polishing agent which can be used.

In general, the coating compositions of this invention can be applied to tablets containing any active medicament. Thus, for example, the coating composition disclosed herein can be used to coat tablets containing, as the active medicament, 7-chloro-2-methylamino-5-phenyl-3H - 1,4 - benzodiazepine - 4 - oxide; 7 - chloro - 1 - methyl-5-phenyl-3H-1,4-benzodiazepin - 2(1H) - one; 2-chloro-9-(3-dimethylaminopropylidene)-thioxanthene; 4-(2-dimethylaminoethoxy) - N-(3,4,5-trimethoxybenzoyl) benzylamine; nicotinyl alcohol; etc. Obviously, the foregoing listing is illustrative only and not intended to be a restriction on the practice or scope of the invention.

It has been found that tablets which are coated with compositions of this invention are provided with a surface film which is characterized by its strength, opaqueness, uniformity and smoothness. This film serves as a barrier which effectively protects the components of the tablets from the destructive influences of the atmosphere. Additionally, the film serves to mask any unpleasant or bitter taste which is associated with the components of the tablet, without, however, either unduly increasing the friability, the weight or size of the tablet or unduly prolonging the disintegrating time thereof.

One of the most significant features of the present invention is in the fact that tablets having the outstanding physical characteristics described heretofore can be obtained, ordinarily, when only four or five separate coats of the present compositions are applied thereto. This is a distinct advantage over the conventional tablet coating compositions of the prior art. Where many prior art compositions are used, it is customary, and at times necessary, to apply such compositions as from about twelve to eighteen separate coats.

For a fuller understanding of the nature and objects of this invention, reference may be had to the following examples which are given merely as further illustrations of the invention and are not to be construed in a limiting sense. All parts given in the examples are parts by weight, unless otherwise indicated.

EXAMPLE 1

In this example 20.0 grams of Gantrez AN-119 was added to, and dissolved in, 450 cc. of acetone at room temperature. To this solution, there was added 8.0 cc. of castor oil, 4.0 mg. of Aerosol OT and 100.0 mg. of D&C Yellow #11. Thereafter, 20.0 grams of titanium dioxide, containing 1% by weight of Cab-o-sil, 4.0 grams of talc and 4.0 grams of FD&C Yellow #5 Lake Dye was added to the solution. The suspension, thus obtained, was homogenized.

The suspension, which was produced as described in the preceding paragraph, was applied to tablets containing 7-chloro-2-methylamino-5-phenyl-3H-1,4-benzodiazepine-4-oxide as the active ingredient. The tablets were prepared by mixing the following named ingredients in the portions hereinafter indicated:

| Ingredient: | Mg./per tablet |
|---|---|
| 7-chloro-2-methylamino-5-phenyl-3H-1,4-benzodiazepine-4-oxide | 10.25 |
| Microcrystalline cellulose | 18.00 |
| Corn starch | 12.00 |
| Dicalcium phosphate | 79.15 |
| Calcium stearate | 0.60 |

The microcrystalline cellulose which was used in the foregoing formulation was the product marketed under the trade name Avicel. The mixture was passed through a screen and it was compressed into tablets weighing 120.0 mg. using a standard concave punch.

In the coating operation, the medicament-containing tablets were placed in a conventional, standard coating pan and a sufficient quantity of the coating composition, described in the first paragraph of this example, was run into the pan to wet the tablets completely. The coating pan was rotated continuously until all of the liquid coating composition was taken up by the tablets. The coated tablets were thereafter dried by cool air for a period of about fifteen minutes.

A second, third, fourth and fifth coat was applied in the same manner as the first coat, care being taken in each coating operation not to over-wet the tablets with the coating composition. After the fifth coat had been applied, the pan was permitted to continue its rotation until the tablets had lost their tackiness and had begun to take on a glossy appearance. At this point, the tablets were removed from the coating pan and then they were placed in a rotating polishing pan where they were dusted to a high gloss with powdered carnauba wax. There was thus obtained, tablets having an attractive appearance and completely satisfactory hardness, friability and disintegration characteristics.

EXAMPE 2

In this example, 4.5 grams of Gantrez AN–119 was dissolved in 100 cc. of acetone at about room temperature. To the solution thus obtained there was added the following named ingredients in the quantities herein indicated:

| | |
|---|---|
| Diethyl phthalate _____cc__ | 2.0 |
| Aerosol OT _____mg__ | 2.0 |
| D&C Yellow Dye #11 _____mg__ | 50.0 |

Thereafter, 10.0 grams of titanium dioxide, containing 1.0% by weight of Cab-o-sil, and 2.0 grams of FD&C Yellow #5 Lake Dye was added to the solution with agitation. The suspension, which was thus produced, was homogenized.

The suspension described in the preceding paragraph was evaluated as a tablet coating composition in the manner described in Example 1. In this instance, however, the suspension was applied in ten separate applications. The tablet which was coated was produced as described in Example 1, such tablet containing 7-chloro-1-methyl-5-phenyl-3H-1,4-benzodiazepin-2(1H)-one as the active ingredient thereof.

Tablets having an attractive appearance and completely satisfactory hardness, friability and disintegration characteristics were obtained.

EXAMPLE 3

In this example, 4.5 grams of Gantrez AN–119 was added to, and dissolved in 100 cc. of ethyl acetate at a temperature elevated above about room temperature. To the solution thus obtained, there was added 2 cc. of diethyl phthalate, 2.0 mg. of glyceryl monostearate and 50.0 mg. of D&C Yellow Dye #11. Thereafter, 2.5 grams of titanium dioxide, containing 1% by weight of Cab-o-sil, and 2.0 grams of FD&C Yellow #5 Lake Dye was added to the solution.

The suspension, thus obtained, was evaluated as a tablet coating composition in the manner described in Example 1, the suspension being applied in ten separate applications. The tablets which were coated were produced as described in Example 1 and they contained 7-chloro-2-methylamino-5-phenyl-3H-1,4-benzodiazepine-4-oxide as the active ingredient thereof.

Using the coating composition described herein, there was obtained tablets having an attractive appearance and completely satisfactory hardness, friability and disintegration characteristics.

EXAMPLE 4

In this example, 4.5 grams of Gantrez AN–119 was added to, and dissolved in, 100 cc. of an ethyl acetate. The following named ingredients, in the quantities hereinafter indicated, were then added to, and dissolved in, that solution.

| | |
|---|---|
| Diethyl phthalate _____cc___ | 2.0 |
| Tween 80 _____mg.___ | 2.0 |
| D&C Yellow #11 Dye _____mg.___ | 50.0 |

Subsequently, 2.5 grams of titanium dioxide, containing 1% by weight of Cab-o-sil, and 2.0 grams of FD&C Yellow #5 Lake Dye was added to the solution. The suspension which was thus obtained was then homogenized.

The suspension, produced as described in the preceding paragraph, was evaluated as a tablet coating composition by the procedure described in Example 1. In this instance, however, the suspension was applied in twelve separate applications. The tablets which were coated were produced as described in Example 1, containing 2-chloro-9 - (3 - dimethylaminopropylidene) - thioxanthene as the active ingredient.

The coated tablets thus obtained were attractive in appearance and they exhibited completely satisfactory hardness, friability and disintegration characteristics.

EXAMPLE 5

In this example, 10.0 grams of Gantrez AN–119 were added to, and dissolved in, 225 cc. of a solution comprising equal parts by weight of acetone and ethylacetate. To this solution there was added the following named ingredients in the quantities hereinafter indicated:

| | |
|---|---|
| Diethyl phthalate _____cc.___ | 2.0 |
| Aerosol OT _____mg.___ | 2.0 |
| D&C Yellow #11 Dye _____mg.___ | 50.0 |

Subsequently, there was added to the solution, 2.0 grams of FD&C Yellow #5 Lake Dye and 10.0 grams of titanium dioxide containing 1% by weight of Cab-o-sil.

The suspension, produced as described in the preceding paragraph was evaluated as a tablet coating composition by the procedure described in Example 1. In this instance, the suspension was applied in twelve separate applications. The tablets which were coated were produced in the manner described in Example 1, containing 4-(2-dimethylaminoethoxy)-N-(3,4,5 - trimethoxybenzoyl) benzylamine as the active ingredient.

By this coating procedure, there was obtained tablets which were attractive in appearance and which had completely satisfactory hardness, friability and disintegration characteristics.

EXAMPLE 6

In this example, 4.5 grams of Gantrez AN–119 were dissolved in 100.0 cc. of ethyl acetate at a temperature elevated somewhat above room temperature. Thereafter, 2.0 mg. of Aerosol OT, 1.0 cc. of diethyl phthalate and 50.0 mg. of D&C Yellow #11 was added to, and dissolved in, the solution. Subsequently, 1.5 grams of titanium dioxide, containing 1.0% by weight of Cab-o-sil, and 2.0 grams of FD&C Yellow #5 Lake Dye was added to, and suspended in, the solution. The suspension, which was thus obtained, was subsequently homogenized.

The suspension, described in the preceding paragraph was evaluated as a tablet coating composition in the manner described in Example 1. The suspension was applied to the tablets in five separate applications. The tablets which were coated were produced as described in Example 1 and they contained 7-chloro-2-methylamino-5-phenyl-3H-1,4-benzodiazepine-4-oxide as the active ingredient.

The tablets, thus obtained, had an attractive appearance and they exhibited completely satisfactory hardness, friability and disintegration characteristics.

We claim:
1. A tablet coating composition comprising (a) from about 3.0% to about 20.0% by weight of a water-soluble polymer, (b) from about 0.001% to about 0.05% by weight of a surface active agent selected from the group consisting of glyceryl monostearate, polyoxyethylene sorbitan monooleate, dioctyl sodium sulfosuccinate and mixtures thereof and (c) an inert organic solvent for said polymer selected from the group consisting of acetone, ethyl acetate and mixtures thereof, said polymer being an interpolymer of methylvinyl ether and maleic anhydride having a structure corresponding to a one to one molar ratio of vinyl ether to anhydride, said polymer having an average molecular weight of about 250,000.

2. The composition of claim 1 wherein there is present up to about 5.0% by weight of a plasticizing agent selected from the group consisting of castor oil, diethyl phthalate, dioctyl phthalate and mixtures thereof.

3. The composition of claim 1 wherein there is present up to about 10.0% by weight of titanium dioxide.

4. The composition of claim 3 wherein there is present colloidal silica in a quantity of up to about 1% of the weight of titanium dioxide.

5. A tablet coating composition comprising (a) from about 3.5% to about 5.5% by weight of a water-soluble interpolymer of methylvinyl ether and maleic anhydride having a structure corresponding to a one to one molar ratio of vinyl ether to anhydride, said polymer having an average molecular weight of 250,000, (b) from about 0.001% to about 0.05% by weight of dioctyl sodium sulfosuccinate, (c) from about 85.0% to about 95% by weight of ethyl acetate, (d) from about 1.0% to about 10.0% by weight of titanium dioxide, (e) from about 0.01% to about 0.1% by weight of colloidal silica and (f) from about 0.5% to about 2.0% by weight of a plasticizing agent selected from the group consisting of castor oil, diethyl phthalate, dioctyl phthalate and mixtures thereof.

6. The composition of claim 5 wherein the plasticizing agent is castor oil.

7. The composition of claim 5 wherein the plasticizing agent is diethyl phthalate.

8. The composition of claim 5 wherein the plasticizing agent is dioctyl phthalate.

9. A tablet coating composition comprising (a) from about 3.5% to about 5.5% by weight of a water-soluble interpolymer of methylvinyl ether and maleic anhydride having a structure corresponding to a one to one molar ratio of vinyl ether to anhydride, said interpolymer having an average molecular weight of about 250,000, (b) from about 0.001% to about 0.05% by weight of dioctyl sodium sulfosuccinate, (c) from about 85% to about 95% by weight of acetone, (d) from about 1.0% to about 10.0% by weight of titanium dioxide, (e) from about 0.01% to about 0.1% by weight of colloidal silica and (f) from about 0.5% to about 2.0% by weight of a plasticizing agent selected from the group consisting of castor oil, diethyl phthalate, dioctyl phthalate and mixtures thereof.

10. The composition of claim 9 wherein the plasticizing agent is castor oil.

11. The composition of claim 9 wherein the plasticizing agent is diethyl phthalate.

12. The composition of claim 9 wherein the plasticizing agent is dioctyl phthalate.

References Cited

UNITED STATES PATENTS

| | | | |
|---|---|---|---|
| 2,723,248 | 11/1955 | Wright | 260—895 |
| 2,897,121 | 7/1959 | Wagner | 167—82 |
| 2,925,365 | 2/1960 | Nicholson et al. | 167—82 |
| 2,928,769 | 3/1960 | Gaunt | 167—82 |
| 2,954,323 | 9/1960 | Endicott et al. | 167—82 |
| 3,143,472 | 8/1964 | Lappas et al. | 167—82 |
| 3,149,041 | 9/1964 | Jeffries | 167—82 |
| 3,244,596 | 4/1966 | Lach | 167—82 |

OTHER REFERENCES

Cabot Corp.: "Cab-o-sil," Form XM 926, 1962, p. 3.

DONALD E. CZAJA, *Primary Examiner.*

R. A. WHITE, *Assistant Examiner.*